US011939882B2

(12) United States Patent
Kitada et al.

(10) Patent No.: US 11,939,882 B2
(45) Date of Patent: Mar. 26, 2024

(54) TURBINE ROTOR BLADE AND GAS TURBINE

(71) Applicant: Mitsubishi Power, Ltd., Kanagawa (JP)

(72) Inventors: Hiroki Kitada, Yokohama (JP); Hiroyuki Otomo, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 232 days.

(21) Appl. No.: 17/281,425

(22) PCT Filed: Nov. 12, 2019

(86) PCT No.: PCT/JP2019/044261
§ 371 (c)(1),
(2) Date: Nov. 5, 2021

(87) PCT Pub. No.: WO2020/148981
PCT Pub. Date: Jul. 23, 2020

(65) Prior Publication Data

US 2022/0220856 A1 Jul. 14, 2022

(30) Foreign Application Priority Data

Jan. 17, 2019 (JP) ................................ 2019-005699

(51) Int. Cl.
*F01D 5/18* (2006.01)

(52) U.S. Cl.
CPC .......... *F01D 5/186* (2013.01); *F05D 2220/32* (2013.01); *F05D 2240/30* (2013.01); *F05D 2260/202* (2013.01)

(58) Field of Classification Search
CPC ..... F01D 5/186; F01D 5/187; F05D 2260/202
See application file for complete search history.

(56) References Cited

U.S. PATENT DOCUMENTS

| | | | | |
|---|---|---|---|---|
| 4,500,258 A * | 2/1985 | Dodd | ...................... | F01D 5/187 416/97 R |
| 5,374,162 A | 12/1994 | Green | | |

(Continued)

FOREIGN PATENT DOCUMENTS

| | | |
|---|---|---|
| CN | 107143383 | 9/2017 |
| EP | 3 098 385 | 11/2016 |

(Continued)

OTHER PUBLICATIONS

Office Action dated Sep. 30, 2022 in counterpart CN Application No. 201980067795.9.

(Continued)

*Primary Examiner* — Eldon T Brockman
(74) *Attorney, Agent, or Firm* — Wenderoth, Lind & Ponack, L.L.P.

(57) ABSTRACT

A turbine rotor blade includes a leading edge portion having a plurality of cooling holes. The plurality of cooling holes includes: m cooling holes arranged in a first range in the blade height direction, where m is an integer of 2 or more; and n cooling holes arranged in a second range on the blade tip side of the first range in the blade height direction, where n is an integer of 2 or more, and n/b<m/a is satisfied, where a is the dimension of the first range in the blade height direction, and b is the dimension of the second range in the blade height direction.

10 Claims, 9 Drawing Sheets

(56) References Cited

U.S. PATENT DOCUMENTS

| | | | | |
|---|---|---|---|---|
| 8,734,108 | B1 | 5/2014 | Liang | |
| 9,631,498 | B2 | 4/2017 | Yokoyama | |
| 10,077,667 | B2 * | 9/2018 | Lewis | F01D 9/041 |
| 11,326,458 | B2 * | 5/2022 | Ahmad | F01D 5/186 |
| 2002/0187039 | A1 | 12/2002 | Rinck et al. | |
| 2006/0013691 | A1 | 1/2006 | Athans et al. | |
| 2007/0048133 | A1 | 3/2007 | Palmer et al. | |
| 2010/0003127 | A1 | 1/2010 | Reeves et al. | |
| 2010/0068033 | A1 | 3/2010 | Liang | |
| 2016/0326886 | A1 * | 11/2016 | Lewis | F01D 5/186 |
| 2021/0156263 | A1 * | 5/2021 | Ahmad | F01D 5/186 |

FOREIGN PATENT DOCUMENTS

| | | |
|---|---|---|
| EP | 3 333 366 | 6/2018 |
| JP | 9-505865 | 6/1997 |
| JP | 11-193701 | 7/1999 |
| JP | 2002-364303 | 12/2002 |
| JP | 2006-29329 | 2/2006 |
| JP | 2007-64226 | 3/2007 |
| JP | 2009-103123 | 5/2009 |
| JP | 2012-154232 | 8/2012 |
| JP | 5536001 | 7/2014 |

OTHER PUBLICATIONS

International Preliminary Report on Patentability dated Jul. 29, 2021 in International Application No. PCT/JP2019/044261, with English language translation.

International Search Report dated Jan. 28, 2020 in International Application No. PCT/JP2019/044261, with English-language translation.

Notice of Reasons for Refusal dated Dec. 6, 2022 in corresponding Japanese Patent Application No. 2019-005699, with English language translation.

* cited by examiner

TURBINE ROTOR BLADE AND GAS TURBINE

TECHNICAL FIELD

The present disclosure relates to a turbine rotor blade and a cooling structure of a gas turbine.

BACKGROUND

Since a turbine rotor blade of a gas turbine is exposed to hot gas, the blade surface is film-cooled by injecting cooling air from a plurality of cooling holes formed in the leading edge portion. The cooling hole has an effect of cooling the leading edge portion through the inner surface of the cooling hole (heat sink effect) in addition to the film cooling effect.

For example, Patent Document 1 discloses a turbine rotor blade including a leading edge portion having three cooling hole rows linearly arranged along the blade height direction.

CITATION LIST

Patent Literature

Patent Document 1: JP5536001B

SUMMARY

Problems to be Solved

In a typical turbine rotor blade, the curvature radius of the blade surface at the leading edge decreases toward the blade tip (tip side). In this case, if the leading edge portion has a plurality of cooling holes arranged along the blade height direction as in the turbine rotor blade of Patent Document 1, the distance between adjacent cooling holes tends to decrease toward the blade tip. In such a case, at the leading edge portion, the blade tip side is more likely to be cooled than the blade root side (hub side). Accordingly, when a sufficient amount of cooling air is supplied to the cooling holes on the blade root side, an excessive amount of cooling air is supplied to the cooling holes on the blade tip side.

In view of the above, an object of at least one embodiment of the present invention is to provide a turbine rotor blade and a gas turbine whereby it is possible to cool the leading edge portion with a small amount of cooling air.

Solution to the Problems (1) A turbine rotor blade according to at least one embodiment of the present invention comprises: a leading edge portion having a plurality of cooling holes. The plurality of cooling holes includes: m cooling holes arranged in a first range in a blade height direction, where m is an integer of 2 or more; and n cooling holes arranged in a second range on a blade tip side of the first range in the blade height direction, where n is an integer of 2 or more, and $n/b<m/a$ is satisfied, where a is a dimension of the first range in the blade height direction, and b is a dimension of the second range in the blade height direction.

With the turbine rotor blade described in the above (1), since $n/b<m/a$ is satisfied, it is possible to prevent that an excessive amount of cooling air is supplied to the cooling holes in the second range. Thus, the amount of cooling air supplied to the cooling holes in the first range and the amount of cooling air supplied to the cooling holes in the second range can be optimized, and the leading edge portion can be effectively cooled with a small amount of cooling air.

(2) In some embodiments, in the above configuration (1), a curvature radius of a blade surface of the leading edge portion in a cross-section perpendicular to the blade height direction decreases toward a blade tip.

When the curvature radius of the blade surface of the leading edge portion in a cross-section perpendicular to the blade height direction decreases toward the blade tip, the distance between adjacent cooling holes at the leading edge portion decreases toward the blade tip. Therefore, if n/b is equal to m/a, the blade tip side is more likely to be cooled than the blade root side.

In this regard, with the turbine rotor blade described in the above (2), since $n/b<m/a$ is satisfied, it is possible to prevent that an excessive amount of cooling air is supplied to the cooling holes in the second range. Thus, the amount of cooling air supplied to the cooling holes in the first range and the amount of cooling air supplied to the cooling holes in the second range can be optimized, and the leading edge portion can be effectively cooled with a small amount of cooling air.

(3) In some embodiments, in the above configuration (1), the second range is located between a position at one-half of a blade height and the blade tip.

With the turbine rotor blade described in the above (3), the amount of cooling air supplied to the cooling holes in a range in the vicinity of the blade tip, where the supply amount of cooling air tends to be excessive, can be reduced, and the leading edge portion can be effectively cooled with a small amount of cooling air.

(4) In some embodiments, in the above configuration (3), the second range includes a range from a position at two-thirds of the blade height to the blade tip.

With the turbine rotor blade described in the above (4), the amount of cooling air supplied to the cooling holes in the range in the vicinity of the blade tip, where the supply amount of cooling air tends to be excessive, can be reduced, and the leading edge portion can be effectively cooled with a small amount of cooling air.

(5) In some embodiments, in the turbine rotor blade described in any one of the above (1) to (4), the plurality of cooling holes includes: a plurality of cooling hole rows each of which is arranged along the blade height direction in the first range; and at least one cooling hole row which or each of which is arranged along the blade height direction in the second range. The number of cooling hole rows in the second range is less than the number of cooling hole rows in the first range.

When the curvature radius of the blade surface of the leading edge portion in a cross-section perpendicular to the blade height direction decreases toward the blade tip, the distance between adjacent cooling hole rows at the leading edge portion decreases toward the blade tip. Therefore, if the number of cooling hole rows in the first range is equal to the number of cooling hole rows in the second range, the blade tip side is more likely to be cooled than the blade root side.

In this regard, with the turbine rotor blade described in the above (5), since the number of cooling hole rows in the second range is less than the number of cooling hole rows in the first range, it is possible to prevent that an excessive amount of cooling air is supplied to the cooling hole row(s) in the second range. Thus, the amount of cooling air supplied to the cooling holes in the first range and the amount of cooling air supplied to the cooling holes in the second range can be optimized, and the leading edge portion can be effectively cooled with a small amount of cooling air.

(6) In some embodiments, in the above configuration (5), the number of cooling hole rows in the first range is 3, and the number of cooling hole rows in the second range is 2.

With the turbine rotor blade described in the above (6), compared with the case where the number of cooling hole rows in the first range and the number of cooling hole rows in the second range are both 3, it is possible to prevent that an excessive amount of cooling air is supplied to the cooling hole rows in the second range. Thus, the leading edge portion can be effectively cooled with a small amount of cooling air.

(7) In some embodiments, in the above configuration (6), the plurality of cooling hole rows in the first range includes a pressure-side cooling hole row formed on a pressure surface, a suction-side cooling hole row formed on a suction surface, and a middle cooling hole row formed between the pressure-side cooling hole row and the suction-side cooling hole row. The at least one cooling hole row in the second range includes a pressure-side cooling hole row formed on the pressure surface, and a suction-side cooling hole row formed on the suction surface.

With the turbine rotor blade described in the above (7), the leading edge portion exposed to hot gas can be effectively cooled from the pressure surface to the suction surface with a small amount of cooling air.

(8) In some embodiments, in the above configuration (7), the pressure-side cooling hole row in the first range is arranged along a first virtual line which is linear, the suction-side cooling hole row in the first range is arranged along a second virtual line which is linear, the middle cooling hole row is arranged along a third virtual line which is linear, and when X is defined as a distance between the first virtual line and the second virtual line at a same position in the blade height direction on the blade surface, Y is defined as a distance between the second virtual line and the third virtual line at a same position in the blade height direction on the blade surface, Ymax is defined as a maximum value of the distance Y in the first range, and h1 is defined as a position in the blade height direction such that the distance X is less than the distance Ymax, the second range is located between the position h1 and the blade tip.

With the turbine rotor blade described in the above (8), even when the number of cooling hole rows in the second range is less than the number of cooling hole rows in the first range, since the second range is located between the position h1 and the blade tip, the distance between cooling hole rows in the second range can be made less than the distance Ymax. Thus, it is possible to prevent the supply amount of cooling air to the cooling hole rows in the second range from being insufficient. Thus, the amount of cooling air supplied to the cooling holes in the first range and the amount of cooling air supplied to the cooling holes in the second range can be optimized, and the leading edge portion can be effectively cooled with a small amount of cooling air.

(9) In some embodiments, in the turbine rotor blade described in the above (7) or (8), each of the cooling holes of the pressure-side cooling hole row in the first range extends along a direction parallel to a first straight line intersecting the pressure surface, each of the cooling holes of the suction-side cooling hole row in the first range extends along a direction parallel to a second straight line intersecting the suction surface, each of the cooling holes of the pressure-side cooling hole row in the second range extends along a direction parallel to a third straight line intersecting the pressure surface, each of the cooling holes of the suction-side cooling hole row in the second range extends along a direction parallel to a fourth straight line intersecting the suction surface, and an angle between the third straight line and the fourth straight line is less than an angle between the first straight line and the second straight line.

With the turbine rotor blade described in the above (9), the leading edge portion exposed to hot gas can be effectively cooled from the pressure surface to the suction surface with a small amount of cooling air.

(10) A gas turbine according to at least one embodiment of the present invention comprises: a compressor for producing compressed air; a combustor for producing combustion gas using the compressed air and fuel; and a turbine configured to be driven by the combustion gas, and the turbine includes the turbine rotor blade described in any one of the above (1) to (9).

With the gas turbine described in the above (10), since the turbine rotor blade described in any one of the above (1) to (9) is included, the amount of cooling air supplied to the cooling holes in the first range and the amount of cooling air supplied to the cooling holes in the second range can be optimized, and the leading edge portion can be effectively cooled with a small amount of cooling air. Therefore, damage of the turbine rotor blade can be reduced with a small amount of cooling air, so that the gas turbine can be stably operated.

Advantageous Effects

At least one embodiment of the present invention provides a turbine rotor blade and a gas turbine whereby it is possible to cool the leading edge portion with a small amount of cooling air.

50 between the fourth virtual line V4 and the fifth virtual line V5 at the same position in the blade height direction.

Figure 9:
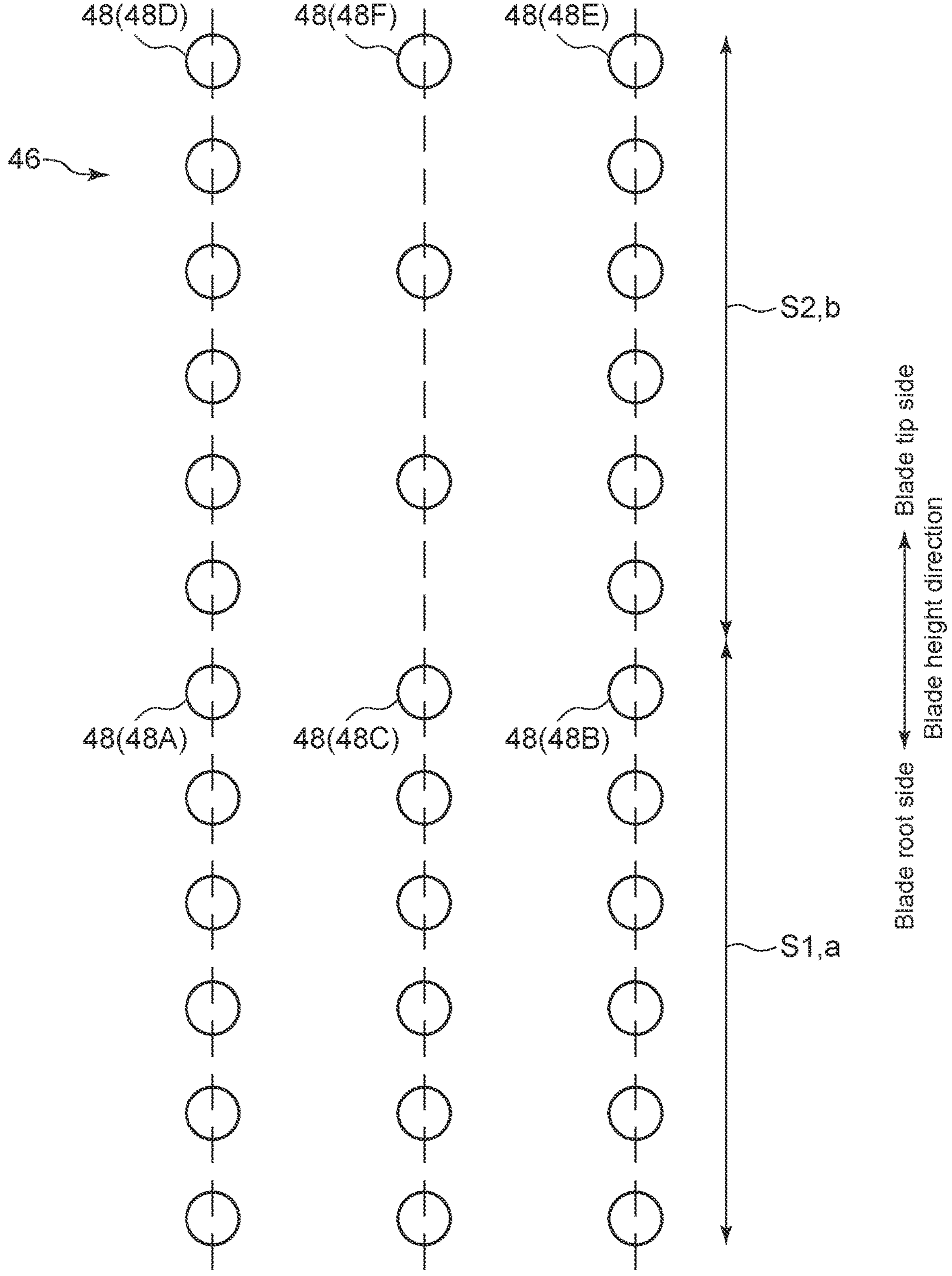

FIG. 9 is a diagram showing another example of the arrangement of the cooling holes 48 of the leading edge portion 46.

Figure 10:
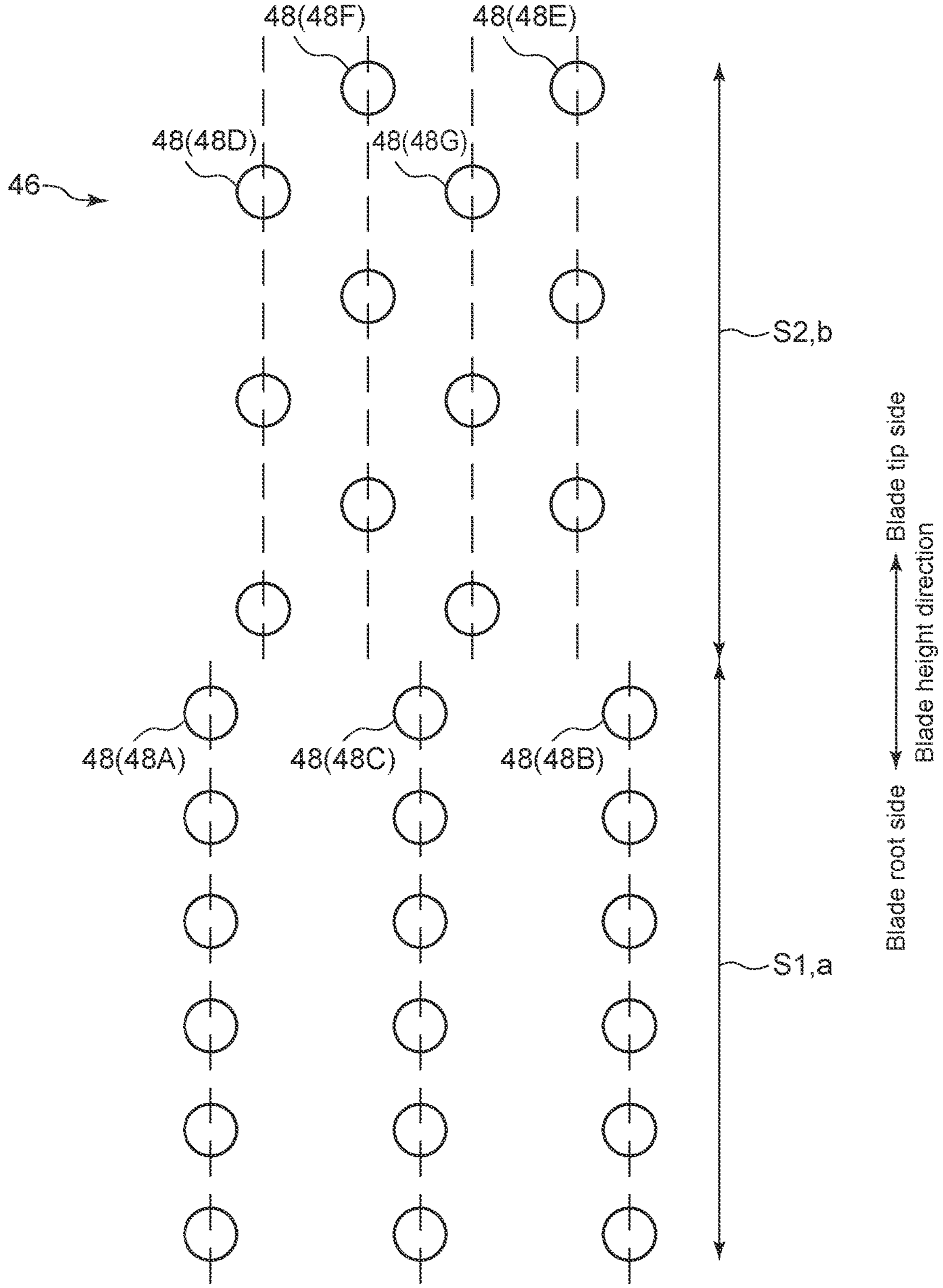

FIG. 10 is a diagram showing another example of the arrangement of the cooling holes 48 of the leading edge portion 46.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
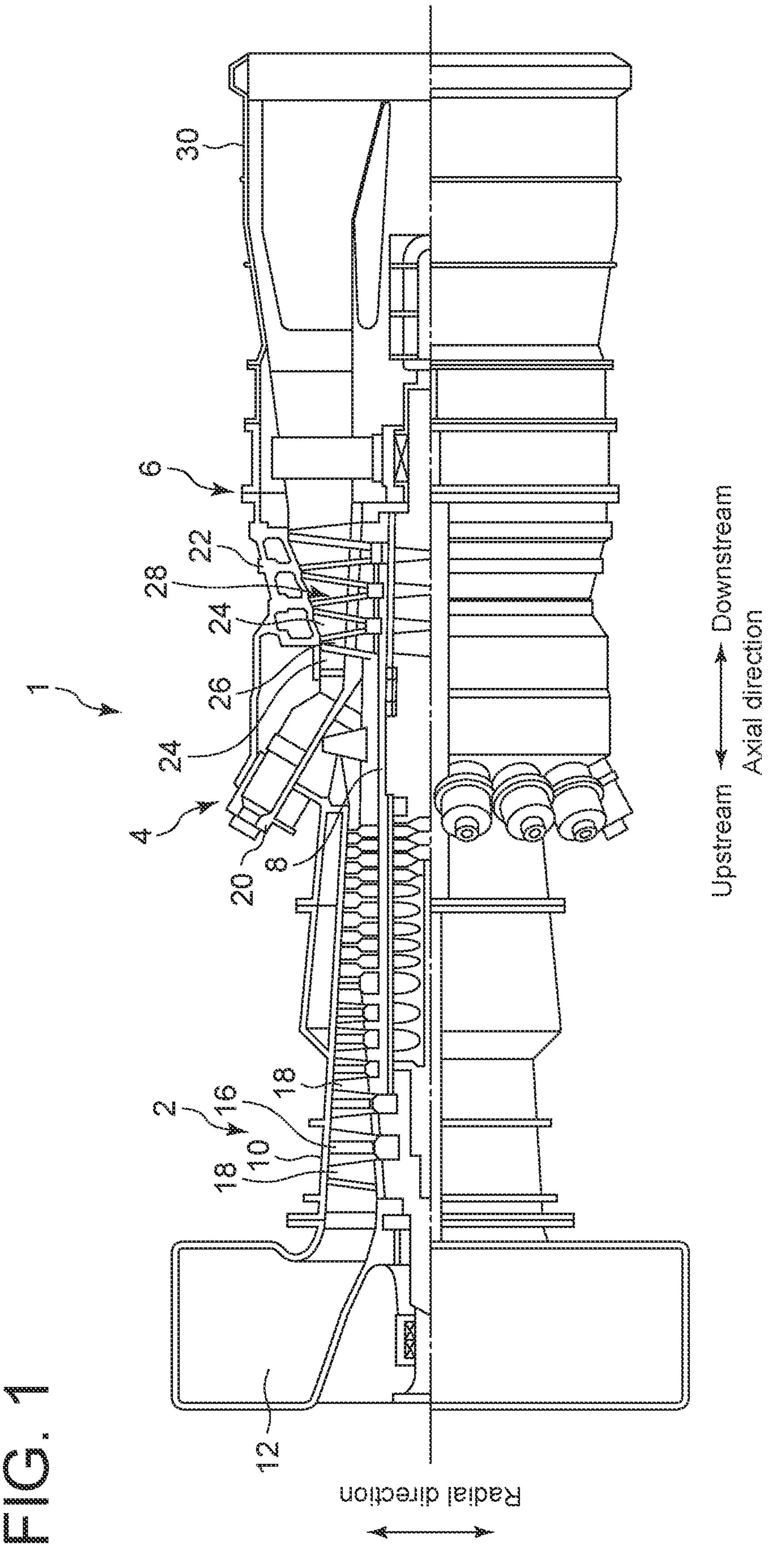
FIG. 1 is a schematic configuration diagram of a gas turbine 1 according to an embodiment.

FIG. 1 is a schematic configuration diagram of a gas turbine 1 according to an embodiment.

As shown in FIG. 1, the gas turbine 1 includes a compressor 2 for producing compressed air, a combustor 4 for producing combustion gas from the compressed air and fuel, and a turbine 6 configured to be rotationally driven by the combustion gas. In the case of the gas turbine 1 for power generation, a generator (not shown) is connected to the turbine 6.

The compressor 2 includes a plurality of compressor stator vanes 16 fixed to a compressor casing 10 and a plurality of compressor rotor blades 18 implanted on a rotor shaft 8 so as to be arranged alternately with the compressor stator vanes 16. To the compressor 2, air sucked in from an air inlet 12 is supplied. The air flows through the plurality of compressor stator vanes 16 and the plurality of compressor rotor blades 18 to be compressed into compressed air having a high temperature and a high pressure.

The combustor 4 is supplied with fuel and the compressed air produced in the compressor 2. The combustor 4 combusts the fuel to produce combustion gas that serves as a working fluid of the turbine 6. As shown in FIG. 1, the gas turbine 1 has a plurality of combustors 4 arranged along the circumferential direction around the rotor shaft 8 inside a casing 20.

The turbine 6 has a combustion gas passage 28 formed by a turbine casing 22 and includes a plurality of turbine stator vanes 24 and a plurality of turbine rotor blades 26 disposed in the combustion gas passage 28. The turbine stator vanes 24 are fixed to the turbine casing 22, and a set of the turbine stator vanes 24 arranged along the circumferential direction of the rotor shaft 8 forms a stator vane array. Further, the turbine rotor blades 26 are implanted on the rotor shaft 8, and a set of the turbine rotor blades 26 arranged along the circumferential direction of the rotor shaft 8 forms a rotor blade array. The stator vane arrays and the rotor blade arrays are arranged alternately in the axial direction of the rotor shaft 8.

In the turbine 6, as the combustion gas introduced from the combustor 4 into the combustion gas passage 28 passes through the plurality of turbine stator vanes 24 and the plurality of turbine rotor blades 26, the rotor shaft 8 is rotationally driven. Thereby, the generator connected to the rotor shaft 8 is driven to generate power. The combustion gas having driven the turbine 6 is discharged outside via an exhaust chamber 30.

Figure 2:
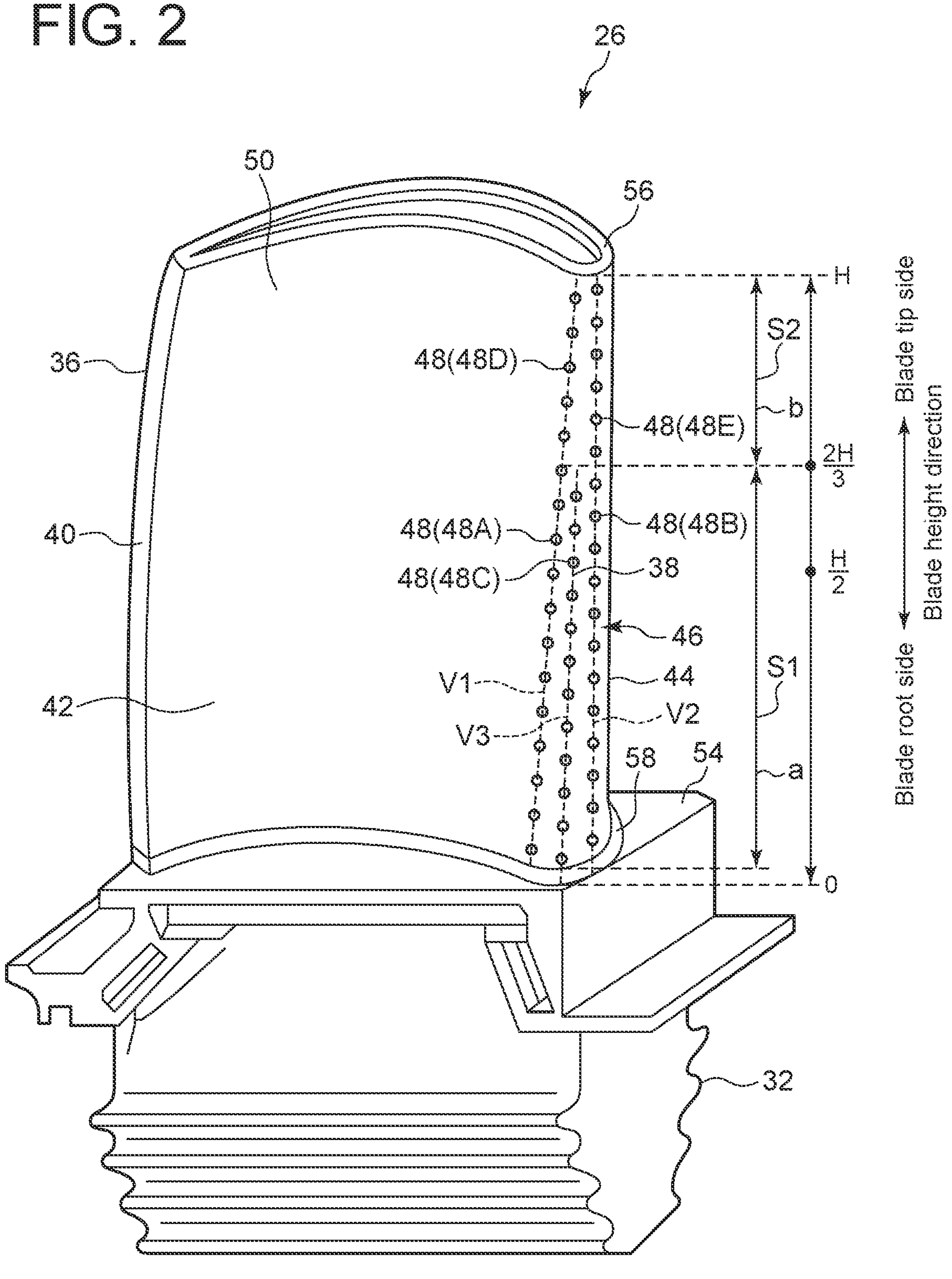
FIG. 2 is a schematic configuration diagram of a turbine rotor blade 26 according to an embodiment.
Figure 3:
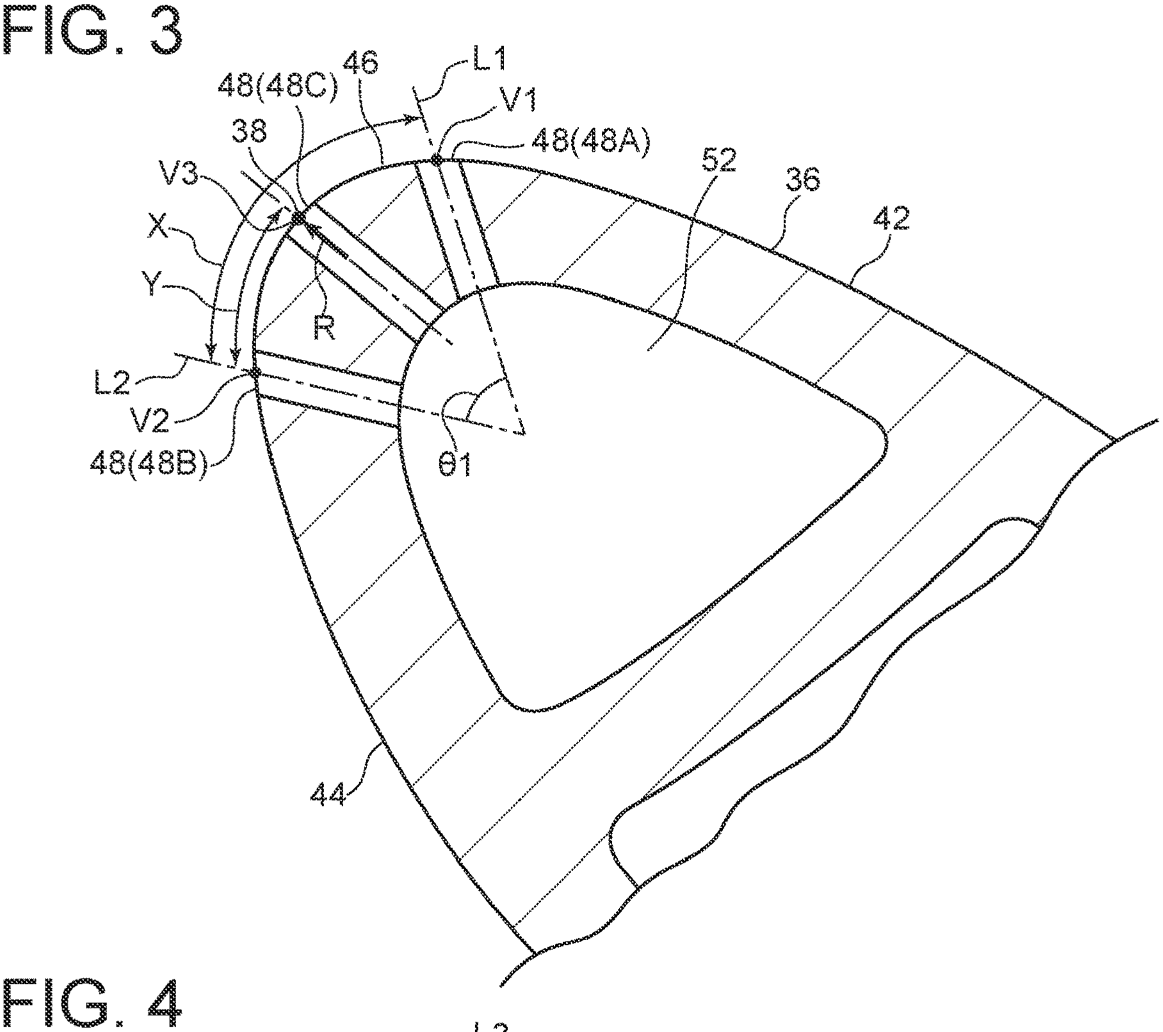
FIG. 3 is a partial view of a cross-section of the turbine rotor blade 26 shown in FIG. 2 in a first range S1 taken perpendicular to the blade height direction.
Figure 4:
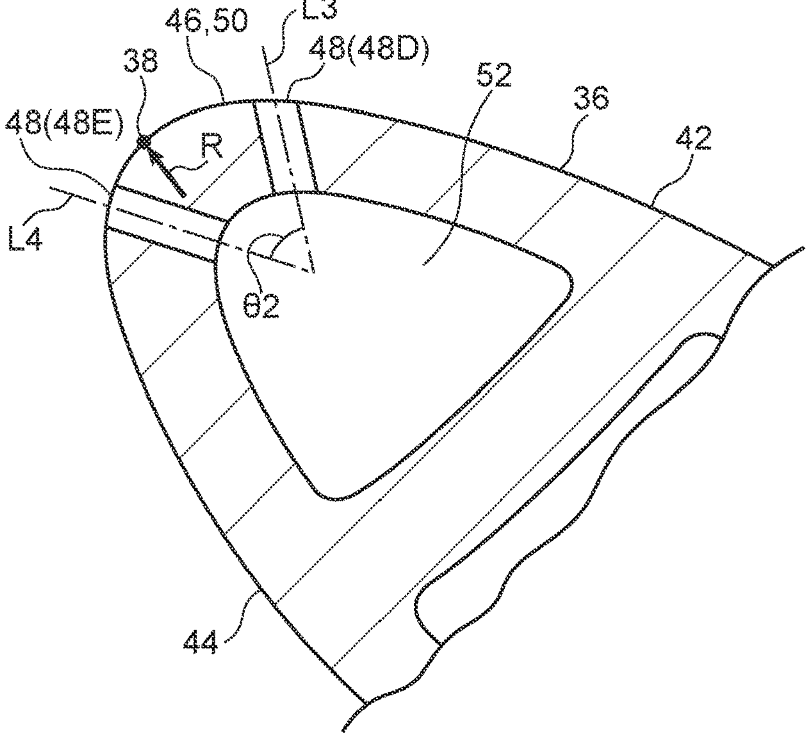
FIG. 4 is a partial view of a cross-section of the turbine rotor blade 26 shown in FIG. 2 in a second range S2 taken perpendicular to the blade height direction.

FIG. 2 is a schematic configuration diagram of the turbine rotor blade 26 according to an embodiment. FIG. 3 is a partial view of a cross-section of the turbine rotor blade 26 shown in FIG. 2 in a first range S1 taken perpendicular to the blade height direction (radial direction of rotor shaft 8). FIG. 4 is a partial view of a cross-section of the turbine rotor blade 26 shown in FIG. 2 in a second range S2 taken perpendicular to the blade height direction.

As shown in FIG. 2, the turbine rotor blade 26 includes a root portion 32 fixed to the rotor shaft 8 (see FIG. 1) and an airfoil portion 36 having an airfoil cross-section. A blade surface 50 of the airfoil portion 36 includes a leading edge 38, a trailing edge 40, a pressure surface 42, and a suction surface 44. The curvature radius R of the blade surface 50 at a leading edge portion 46 in a cross-section perpendicular to the blade height direction shown in FIGS. 3 and 4 decreases toward a blade tip 56 (tip of the airfoil portion 36 in the blade height direction) shown in FIG. 2.

As shown in FIG. 2, the leading edge portion 46 of the airfoil portion 36 has a plurality of cooling holes 48. The plurality of cooling holes 48 of the leading edge portion 46 includes a plurality of cooling hole rows 48A, 48B, 48C each arranged linearly along the blade height direction in the first range S1 in the blade height direction.

The plurality of cooling hole rows 48A, 48B, 48C includes a pressure-side cooling hole row 48A formed on the pressure surface 42, a suction-side cooling hole row 48B formed on the suction surface 44, and a middle cooling hole row 48C formed between the pressure-side cooling hole row 48A and the suction-side cooling hole row 48B.

The pressure-side cooling hole row 48A is composed of a plurality of cooling holes 48 arranged along a first virtual line V1 which linearly extends along the blade height direction. The suction-side cooling hole row 48B is composed of a plurality of cooling holes 48 arranged along a second virtual line V2 which linearly extends along the blade height direction. The middle cooling hole row 48C is composed of a plurality of cooling holes 48 arranged along a third virtual line V3 which linearly extends along the blade height direction. The cooling holes 48 formed in the first range S1 of the leading edge portion 46 are staggeringly arranged. In the illustrated exemplary embodiment, a fillet portion 58 is formed at the boundary between a hub surface 54 of the turbine rotor blade 26 and the blade surface 50 of the airfoil portion 36. The fillet portion 58 has no cooling holes 48. The upper end of the fillet portion 58 corresponds to the lower end of the first range S1.

The plurality of cooling holes 48 of the leading edge portion 46 includes a plurality of cooling hole rows 48D, 48E each arranged linearly along the blade height direction in the second range S2 on the blade tip 56 side of the first range S1 in the blade height direction. The first range S1 and the second range S2 are adjacent to each other in the blade height direction. In the illustrated exemplary embodiment, the second range S2 is located between the position at one-half of the blade height H and the blade tip 56. For example, the second range S2 is a range from the position at two-thirds of the blade height H to the blade tip 56. Here, the blade height H means the height of the turbine rotor blade 26 along the radial direction of the rotor shaft 8 from the hub surface 54 to the blade tip 56.

The plurality of cooling hole rows 48D, 48E includes a pressure-side cooling hole row 48D formed on the pressure surface 42, and a suction-side cooling hole row 48E formed on the suction surface 44. The pressure-side cooling hole row 48D is composed of a plurality of cooling holes 48 arranged along the first virtual line V1. The suction-side cooling hole row 48E is composed of a plurality of cooling holes 48 arranged along the second virtual line V2. The cooling holes 48 formed in the second range S2 of the leading edge portion 46 are staggeringly arranged.

In the illustrated exemplary embodiment, the number of cooling hole rows 48A, 48B, 48C in the first range S1 of the leading edge portion 46 is 3, and the number of cooling hole rows 48D, 48E in the second range S2 of the leading edge portion 46 is 2. Thus, the number of cooling hole rows 48D, 48E in the second range S2 of the leading edge portion 46 is set to be less than the number of cooling hole rows 48A, 48B, 48C in the first range S1. Further, $n/b<m/a$ is satisfied, where m is the number of cooling holes 48 arranged in the first range S1 among the plurality of cooling holes 48 of the leading edge portion 46 (provided that m is an integer of 2 or more), n is the number of cooling holes 48 arranged in the second range S2 among the plurality of cooling holes 48 of the leading edge portion 46 (provided that n is an integer of 2 or more), a is the dimension of the first range S1 in the blade height direction, and b is the dimension of the second range S2 in the blade height direction. That is, a value obtained by dividing d by b is smaller than a value obtained by dividing m by a.

As shown in FIGS. 3 and 4, a cooling passage 52 extending along the blade height direction is formed inside the airfoil portion 36, and each cooling hole 48 of the leading edge portion 46 communicates with the cooling passage 52. The cooling passage 52 is supplied with a part of the compressed air produced by the compressor 2 (see FIG. 1) as cooling air. The cooling air flows from the cooling passage 52 to each cooling hole 58 and is used for film cooling of the blade surface 50.

As shown in FIG. 3, each cooling hole 48 of the pressure-side cooling hole row 48A extends along a direction parallel to a first straight line L1 intersecting the pressure surface 42. Each cooling hole 48 of the suction-side cooling hole row 48B extends along a direction parallel to a second straight line L2 intersecting the suction surface 44.

Further, as shown in FIG. 4, each cooling hole 48 of the pressure-side cooling hole row 48D extends along a direction parallel to a third straight line L3 intersecting the pressure surface 42. Each cooling hole 48 of the suction-side cooling hole row 48E extends along a direction parallel to a fourth straight line L4 intersecting the suction surface 44. Here, the angle θ2 between the third straight line L3 and the fourth straight line L4 is equal to the angle θ1 between the first straight line L1 and the second straight line L2.

Figure 5:
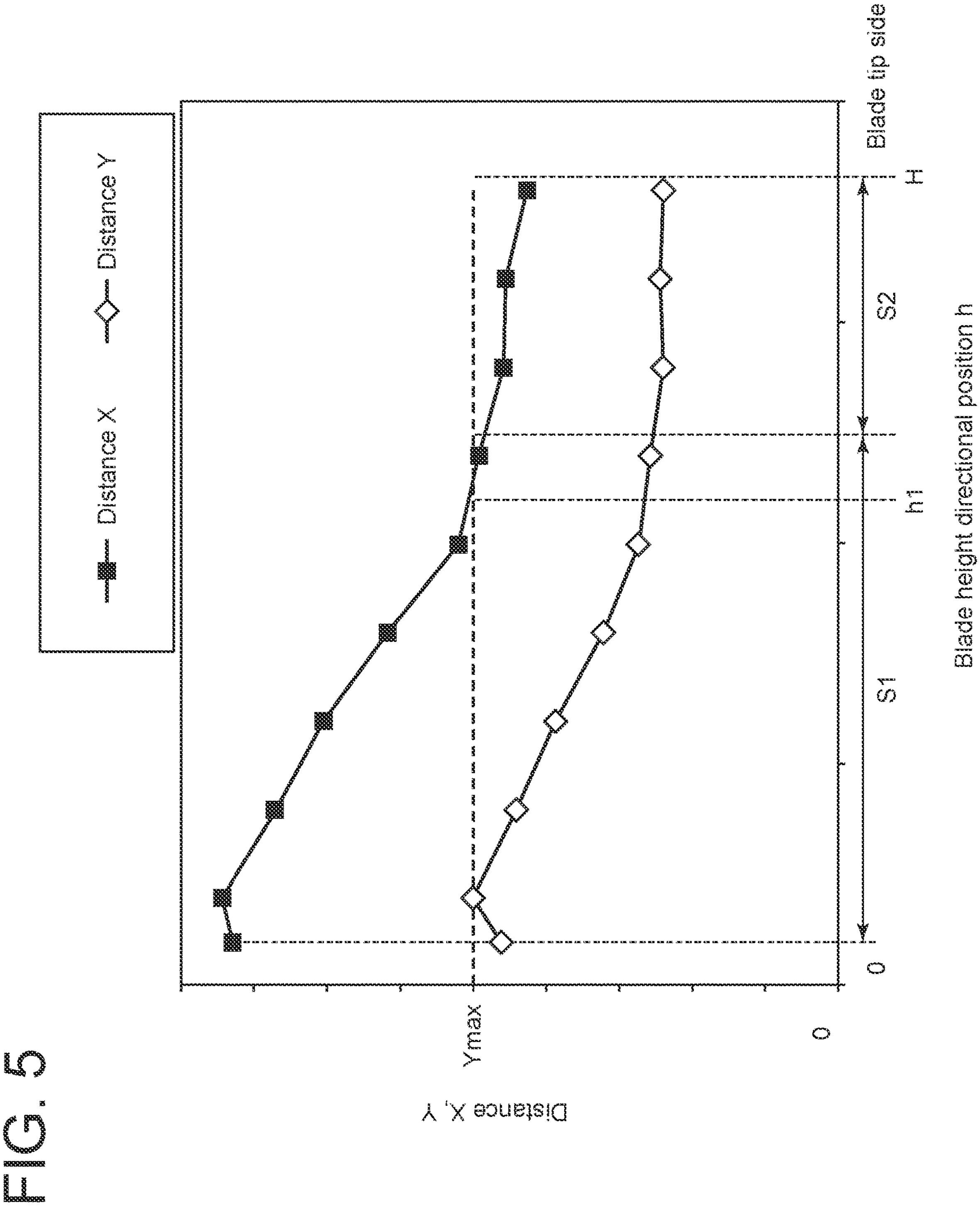
FIG. 5 is a diagram showing a relationship between the blade height directional position h and the distance X, Y, when X is defined as a distance on the blade surface 50 between the first virtual line V1 and the second virtual line V2 shown in FIG. 2 or 3 at the same position in the blade height direction, and Y is defined as a distance on the blade surface 50 between the second virtual line V2 and the third virtual line V3 at the same position in the blade height direction.

As shown in FIG. 3, when X is defined as a distance between the first virtual line V1 and the second virtual line V2 at the same position in the blade height direction on the blade surface 50, and Y is defined as a distance between the second virtual line V2 and the third virtual line V3 at the same position in the blade height direction on the blade surface 50, a relationship between the blade height directional position h and the distance X, Y is shown in FIG. 5. The blade height directional position h means a distance from the hub surface 54 in the blade height direction.

As shown in FIG. 5, when Ymax is defined as a maximum value of the distance Y in the first range S1, and h1 is defined as a position in the blade height direction such that the distance X is less than the distance Ymax, the second range S2 is located between the position h1 and the blade tip 56.

With the above configuration, even when the curvature radius R of the blade surface 50 of the leading edge portion 46 decreases toward the blade tip 56, since the number of cooling hole rows 48D, 48E in the second range S2 is set to be less than the number of cooling hole rows 48A, 48B, 48C in the first range S1, $n/b<m/a$ is satisfied, so that it is possible to prevent that an excessive amount of cooling air is supplied to the cooling hole rows 48D, 48E in the second range S2. Thus, the amount of cooling air supplied to the cooling holes 48 in the first range S1 and the amount of cooling air supplied to the cooling holes 48 in the second range S2 can be optimized, and the leading edge portion 46 can be effectively cooled with a small amount of cooling air.

Further, even when the number of cooling hole rows 48D, 48E in the second range S2 is less than the number of cooling hole rows 48A, 48B, 48C in the first range S1, since the second range S2 is located between the position h1 and the blade tip 56, the distance between the cooling hole row 48D and the cooling hole row 48E in the second range S2 can be made less than the distance Ymax. Thus, it is possible to prevent the supply amount of cooling air to the cooling hole rows 48D, 48E in the second range S2 from being insufficient. Thus, the amount of cooling air supplied to the cooling holes 48 in the first range S1 and the amount of cooling air supplied to the cooling holes 48 in the second range S2 can be optimized, and the leading edge portion 46 can be effectively cooled with a small amount of cooling air.

Other embodiments will now be described.

Figure 6:
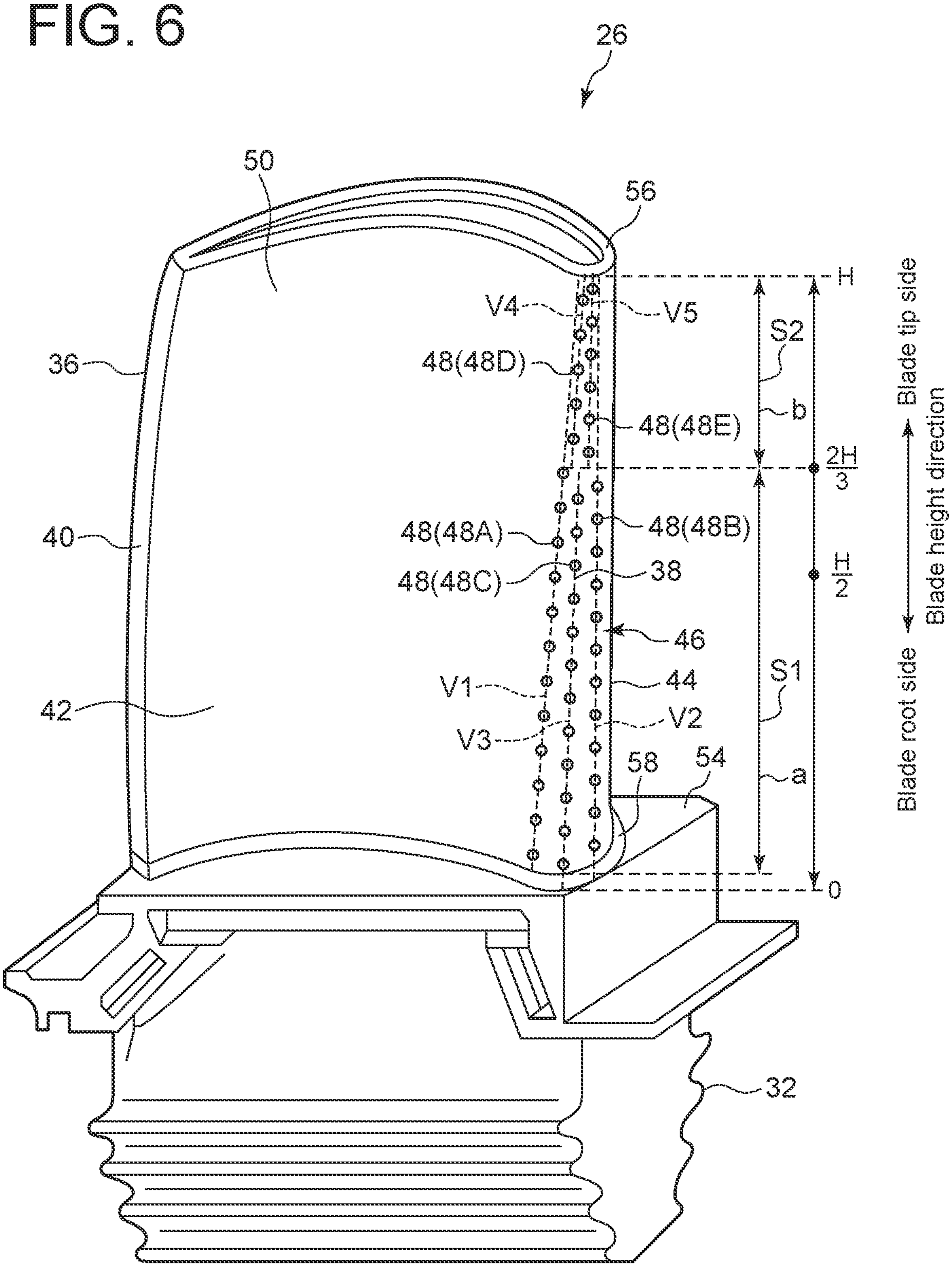
FIG. 6 is a schematic configuration diagram of a turbine rotor blade 26 according to an embodiment.

FIG. 6 is a schematic configuration diagram of the turbine rotor blade 26 according to an embodiment. The embodiment shown in FIG. 6 differs from the embodiment shown in FIG. 2 only in the configuration of the pressure-side cooling hole row 48D and the suction-side cooling hole row 48E; specifically, the distance between the pressure-side cooling hole row 48D and the suction-side cooling hole row 48E in the second range S2 is set narrower than that of the embodiment shown in FIG. 2. Since other configurations are the same as those in the above-described embodiment, the configuration different from the above-described embodiment will be described below.

In the embodiment shown in FIG. 6, the pressure-side cooling hole row 48D is composed of a plurality of cooling holes 48 arranged along a fourth virtual line V4 which linearly extends along the blade height direction. The suction-side cooling hole row 48B is composed of a plurality of cooling holes 48 arranged along a fifth virtual line V5 which linearly extends along the blade height direction. Here, in the second range S2, the fourth virtual line V4 is located closer to the leading edge 38 than the first virtual line V1, and the fifth virtual line V5 is located closer to the leading edge 38 than the second virtual line V2.

Figure 7:
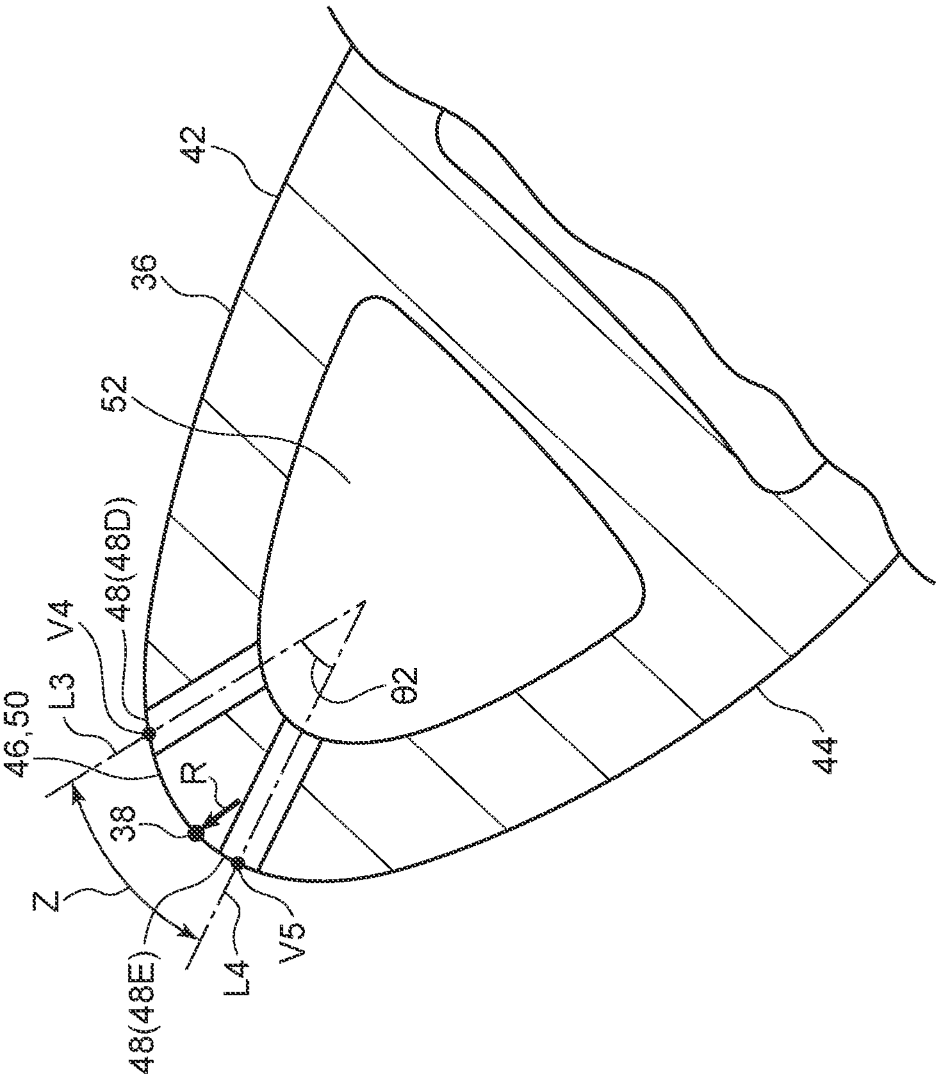
FIG. 7 is a partial view of a cross-section of the turbine rotor blade 26 shown in FIG. 6 in a second range S2 taken perpendicular to the blade height direction.

FIG. 7 is a partial view of a cross-section of the turbine rotor blade 26 shown in FIG. 6 in the second range S2 taken perpendicular to the blade height direction. The configuration of the cross-section of the turbine rotor blade 26 shown in FIG. 6 in the first range S1 taken perpendicular to the blade height direction will not be described, since it is the same as the configuration shown in FIG. 3.

As shown in FIG. 7, each cooling hole 48 of the pressure-side cooling hole row 48D extends along a direction parallel to a third straight line L3 intersecting the pressure surface 42. Each cooling hole 48 of the suction-side cooling hole row 48E extends along a direction parallel to a fourth straight line L4 intersecting the suction surface 44. Here, the angle θ2 between the third straight line L3 and the fourth straight line L4 in the second range S2 is less than the angle θ1 (see FIG. 3) between the first straight line L1 and the second straight line L2 in the first range S1.

Figure 8:
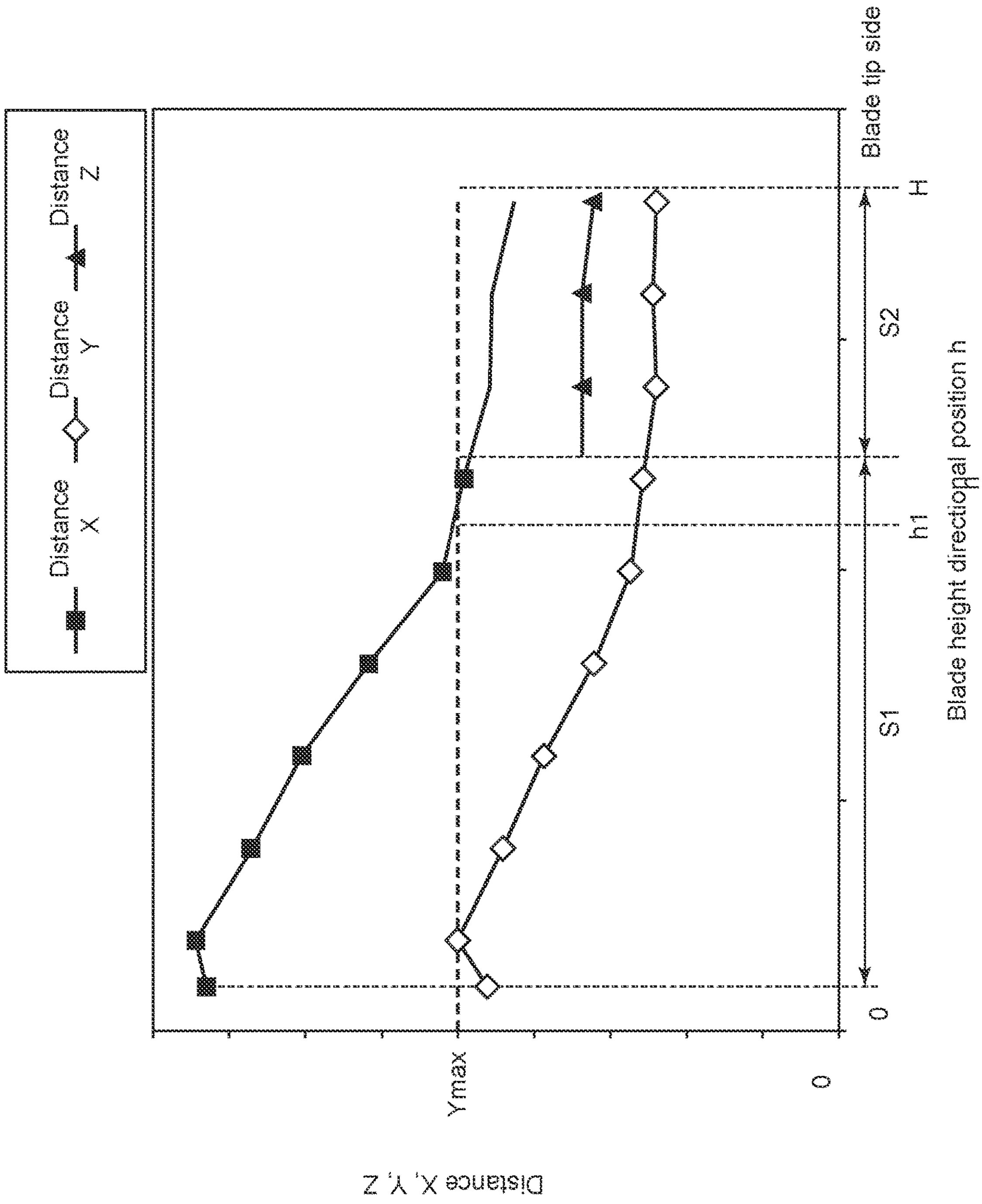
FIG. 8 is a diagram showing a relationship between the blade height directional position h and the distance X, Y, Z, when X is defined as a distance on the blade surface 50 between the first virtual line V1 and the second virtual line V2 shown in FIG. 3, 6, or 7 at the same position in the blade height direction, Y is defined as a distance on the blade surface 50 between the second virtual line V2 and the third virtual line V3 at the same position in the blade height direction, and Z is defined as a distance on the blade surface

As shown in FIGS. 3 and 7, when X is defined as a distance between the first virtual line V1 and the second virtual line V2 at the same position in the blade height direction on the blade surface 50, Y is defined as a distance between the second virtual line V2 and the third virtual line V3 at the same position in the blade height direction on the blade surface 50, and Z is defined as a distance between the fourth virtual line V4 and the fifth virtual line V5 at the same position in the blade height direction on the blade surface 50, a relationship between the blade height directional position h and the distance X, Y, Z is shown in FIG. 8.

In the configuration shown in FIG. 8, when Ymax is defined as a maximum value of the distance Y in the first range S1, and h1 is defined as a position in the blade height direction such that the distance X is less than the distance Ymax, the second range S2 is located between the position h1 and the blade tip 56.

As shown in FIG. 8, in the second range S2, the distance Z between the fourth virtual line V4 and the fifth virtual line V5 at the same position in the blade height direction on the blade surface 50 is set to be less than the distance X between the first virtual line V1 and the second virtual line V2 at the same position in the blade height direction on the blade surface 50.

With the configuration shown in FIGS. 6 to 8, in the same way as described above, even when the curvature radius R of the blade surface 50 of the leading edge portion 46 decreases toward the blade tip 56, since the number of cooling hole rows 48D, 48E in the second range S2 is set to be less than the number of cooling hole rows 48A, 48B, 48C in the first range S1, n/b<m/a is satisfied, so that it is possible to prevent that an excessive amount of cooling air is supplied to the cooling hole rows 48D, 48E in the second range S2. Thus, the amount of cooling air supplied to the cooling holes 48 in the first range S1 and the amount of cooling air supplied to the cooling holes 48 in the second range S2 can be optimized, and the leading edge portion 46 can be effectively cooled with a small amount of cooling air.

Further, even when the number of cooling hole rows 48D, 48E in the second range S2 is less than the number of cooling hole rows 48A, 48B, 48C in the first range S1, since the second range S2 is located between the position h1 and the blade tip 56, the distance between the cooling hole row 48D and the cooling hole row 48E in the second range S2 can be made less than the distance Ymax. Thus, it is possible to prevent the supply amount of cooling air to the cooling hole rows 48D, 48E in the second range S2 from being insufficient. Thus, the amount of cooling air supplied to the cooling holes 48 in the first range S1 and the amount of cooling air supplied to the cooling holes 48 in the second range S2 can be optimized, and the leading edge portion 46 can be effectively cooled with a small amount of cooling air.

In addition, since the angle θ2 between the third straight line L3 and the fourth straight line L4 is less than the angle θ1 between the first straight line L1 and the second straight line L2, the leading edge portion 46 exposed to hot gas can be effectively cooled from the pressure surface 42 to the suction surface 44 with a small amount of cooling air.

The present invention is not limited to the embodiments described above, but includes modifications to the embodiments described above, and embodiments composed of combinations of those embodiments.

For example, in the above-described embodiments, the number of cooling hole rows 48D, 48E in the second range S2 is less than the number of cooling hole rows 48A, 48B, 48C in the first range S1. However, the relationship between the number of cooling hole rows in the second range S2 and the number of cooling hole rows in the first range is not limited, as long as the plurality of cooling holes 48 of the leading edge portion 46 satisfies n/b<m/a. For example, as shown in FIG. 9, the number of cooling hole rows 48D, 48E, 48F in the second range S2 may be equal to the number of cooling hole rows 48A, 48B, 48C in the first range S1, or as shown in FIG. 10, the number of cooling hole rows 48D, 48E, 48F, 48G in the second range S2 may be more than the number of cooling hole rows 48A, 48B, 48C in the first range S1

In the embodiment shown in FIG. 9, while the number of cooling hole rows 48D, 48E, 48F in the second range S2 is equal to the number of cooling hole rows 48A, 48B, 48C in the first range S1, the distance between the cooling holes 48 of the cooling hole row 48F in the second range S2 is more than the distance between the cooling holes 48 of the cooling hole row 48C in the first range S1, so that n/b<m/a is satisfied.

Alternatively, in the embodiment shown in FIG. 10, while the number of cooling hole rows 48D, 48E, 48F, 48G in the second range S2 is more than the number of cooling hole rows 48A, 48B, 48C in the first range S1, the distance (distance in blade height direction) between the cooling holes 48 of each cooling hole row 48D, 48E, 48F, 48G in the second range S2 is more than the distance (distance in blade height direction) between the cooling holes 48 of each cooling hole row 48A, 48B, 48C in the first range S1, so that n/b<m/a is satisfied.

Thus, when n/b<m/a is satisfied, the amount of cooling air supplied to the cooling holes in the first range and the amount of cooling air supplied to the cooling holes in the second range can be optimized, and the leading edge portion can be effectively cooled with a small amount of cooling air.

REFERENCE SIGNS LIST

1 Gas turbine
2 Compressor
4 Combustor
6 Turbine
26 Turbine rotor blade
38 Leading edge
42 Pressure surface
44 Suction surface
46 Leading edge portion
48 Cooling hole
48A, 48D Pressure-side cooling hole row
48B, 48E Suction-side cooling hole row
48C Middle cooling hole row
50 Blade surface
56 Blade tip

The invention claimed is:

1. A turbine rotor blade, comprising a leading edge portion having a plurality of cooling holes, wherein the plurality of cooling holes includes:

m cooling holes arranged in a first range in a blade height direction, where m is an integer of 2 or more; and n cooling holes arranged in a second range on a blade tip side of the first range in the blade height direction, where n is an integer of 2 or more, and wherein n/b<m/a is satisfied, where a is a dimension of the first range in the blade height direction, and b is a dimension of the second range in the blade height direction, wherein the plurality of cooling holes includes:

a plurality of cooling hole rows each of which is arranged along the blade height direction in the first range; and at least one cooling hole row which or each of which is arranged along the blade height direction in the second range, and wherein the number of cooling hole rows in the second range is less than the number of cooling hole rows in the first range, wherein the plurality of cooling hole rows in the first range includes a pressure-side cooling hole row formed on a pressure surface and a suction-side cooling hole row formed on a suction surface, wherein the pressure-side cooling hole row in the first range is arranged along a first virtual line which is linear, wherein the suction-side cooling hole row in the first range is arranged along a second virtual line which is linear, and wherein when X is defined as a distance between the first virtual line and the second virtual line at a same position in the blade height direction on the blade surface, the distance X decreases as the position in the blade height direction changes from the first range to the second range.

2. The turbine rotor blade according to claim 1, wherein a curvature radius of a blade surface of the leading edge portion in a cross-section perpendicular to the blade height direction decreases toward a blade tip.

3. The turbine rotor blade according to claim 1, wherein the second range is located between a position at one-half of a blade height and the blade tip.

4. The turbine rotor blade according to claim 3, wherein the second range includes a range from a position at two-thirds of the blade height to the blade tip.

5. The turbine rotor blade according to claim 1, wherein the number of cooling hole rows in the first range is 3, and wherein the number of cooling hole rows in the second range is 2.

6. The turbine rotor blade according to claim 5, wherein the plurality of cooling hole rows in the first range includes a pressure-side cooling hole row formed on a pressure surface, a suction-side cooling hole row formed on a suction surface, and a middle cooling hole row formed between the pressure-side cooling hole row and the suction-side cooling hole row, and wherein the at least one cooling hole row in the second range includes a pressure-side cooling hole row formed on the pressure surface, and a suction-side cooling hole row formed on the suction surface.

7. A gas turbine, comprising:

a compressor for producing compressed air;

a combustor for producing combustion gas using the compressed air and fuel; and a turbine configured to be driven by the combustion gas, wherein the turbine includes the turbine rotor blade according to claim 1.

8. A turbine rotor blade comprising, a leading edge portion having a plurality of cooling holes, wherein the plurality of cooling holes includes:

m cooling holes arranged in a first range in a blade height direction, where m is an integer of 2 or more; and n cooling holes arranged in a second range on a blade tip side of the first range in the blade height direction, where n is an integer of 2 or more, and wherein n/b<m/a is satisfied, where a is a dimension of the first range in the blade height direction, and b is a dimension of the second range in the blade height direction, wherein the plurality of cooling holes includes:

a plurality of cooling hole rows each of which is arranged along the blade height direction in the first range; and at least one cooling hole row which or each of which is arranged along the blade height direction in the second range, and wherein the number of cooling hole rows in the second range is less than the number of cooling hole rows in the first range, wherein the number of cooling hole rows in the first range is 3, wherein the number of cooling hole rows in the second range is 2, wherein the plurality of cooling hole rows in the first range includes a pressure-side cooling hole row formed on a pressure surface, a suction-side cooling hole row formed on a suction surface, and a middle cooling hole row formed between the pressure-side cooling hole row and the suction-side cooling hole row, wherein the at least one cooling hole row in the second range includes a pressure-side cooling hole row formed on the pressure surface, and a suction-side cooling hole row formed on the suction surface, wherein the pressure-side cooling hole row in the first range is arranged along a first virtual line which is linear, wherein the suction-side cooling hole row in the first range is arranged along a second virtual line which is linear, wherein the middle cooling hole row is arranged along a third virtual line which is linear, and wherein when X is defined as a distance between the first virtual line and the second virtual line at a same position in the blade height direction on the blade surface, Y is defined as a distance between the second virtual line and the third virtual line at a same position in the blade height direction on the blade surface, Ymax is defined as a maximum value of the distance Y in the first range, and h1 is defined as a position in the blade height direction such that the distance X is less than the distance Ymax, the second range is located between the position h1 and the blade tip.

9. The turbine rotor blade according to claim 8, wherein each of the cooling holes of the pressure-side cooling hole row in the first range extends along a direction parallel to a first straight line intersecting the pressure surface, wherein each of the cooling holes of the suction-side cooling hole row in the first range extends along a direction parallel to a second straight line intersecting the suction surface, wherein each of the cooling holes of the pressure-side cooling hole row in the second range extends along a direction parallel to a third straight line intersecting the pressure surface, wherein each of the cooling holes of the suction-side cooling hole row in the second range extends along a direction parallel to a fourth straight line intersecting the suction surface, and wherein an angle between the third straight line and the fourth straight line is less than an angle between the first straight line and the second straight line.

10. A gas turbine, comprising:

a compressor for producing compressed air;

a combustor for producing combustion gas using the compressed air and fuel; and a turbine configured to be driven by the combustion gas, wherein the turbine includes the turbine rotor blade according to claim 8.

* * * * *